US009448849B2

(12) United States Patent
Urmanov et al.

(10) Patent No.: US 9,448,849 B2
(45) Date of Patent: Sep. 20, 2016

(54) PREVENTING OSCILLATORY LOAD BEHAVIOR IN A MULTI-NODE DISTRIBUTED SYSTEM

(75) Inventors: Aleksey M. Urmanov, San Diego, CA (US); Anton A. Bougaev, La Jolla, CA (US); Yuri Langer, Wheaton, IL (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 888 days.

(21) Appl. No.: 13/223,145

(22) Filed: Aug. 31, 2011

(65) Prior Publication Data
US 2013/0054809 A1 Feb. 28, 2013

(51) Int. Cl.
*G06F 11/30* (2006.01)
*G06F 9/50* (2006.01)
*H04L 29/08* (2006.01)

(52) U.S. Cl.
CPC ............ *G06F 9/505* (2013.01); *G06F 9/5083* (2013.01); *H04L 67/1002* (2013.01); *H04L 67/1029* (2013.01)

(58) Field of Classification Search
CPC ....... H04L 47/70; H04L 41/00; H04L 67/10; H04L 47/125; H04L 47/828; H04L 67/1002; H04L 67/1038; H04L 12/5695; H04L 29/08153; H04L 41/0896; H04L 47/783; H04L 67/1029; G06F 9/505; G06F 9/5083
USPC .......................... 709/226, 224; 718/104, 105
See application file for complete search history.

(56) References Cited

U.S. PATENT DOCUMENTS

| | | | |
|---|---|---|---|
| 5,867,706 A | | 2/1999 | Martin |
| 6,067,545 A | * | 5/2000 | Wolff |
| 6,128,642 A | | 10/2000 | Doraswamy |
| 7,519,710 B2 | * | 4/2009 | Martin .................... G06F 9/505 709/223 |
| 7,584,301 B1 | * | 9/2009 | Joshi ............................ 709/244 |
| 7,665,092 B1 | | 2/2010 | Vengerov |
| 7,757,236 B1 | * | 7/2010 | Singh ........................... 718/105 |
| 7,890,624 B2 | | 2/2011 | Bivens |
| 8,370,898 B1 | * | 2/2013 | Jackson ........................... 726/2 |
| 8,699,343 B2 | * | 4/2014 | Abdelal ................ H04L 47/263 370/235 |
| 2005/0022202 A1 | * | 1/2005 | Sannapa Reddy et al. .. 718/105 |
| 2005/0038891 A1 | * | 2/2005 | Martin .................... G06F 9/505 709/225 |
| 2005/0120095 A1 | * | 6/2005 | Aman et al. .................. 709/219 |
| 2008/0263206 A1 | * | 10/2008 | Bivens et al. ................ 709/226 |
| 2010/0271947 A1 | * | 10/2010 | Abdelal ................ H04L 47/263 370/235 |
| 2010/0274893 A1 | * | 10/2010 | Abdelal ............. H04L 29/0602 709/224 |

OTHER PUBLICATIONS

Astrom et al.; "Feedback Systems", from (An introduction for scientists and Engineers); Feb. 22, 2009.*

* cited by examiner

*Primary Examiner* — Kenneth R Coulter
(74) *Attorney, Agent, or Firm* — Park, Vaughan, Fleming & Dowler LLP (57) ABSTRACT

The disclosed embodiments provide a system that prevents oscillatory load behavior for a multi-node distributed system. During operation, the system uses a load-balancing policy to distribute requests to nodes of the distributed system. The system determines operational characteristics for the nodes as they process a set of requests, and then uses these operational characteristics to compute machine queuing models that describe the machine state of each node. The system then uses this machine state for the nodes to determine whether the load-balancing policy and the distributed system are susceptible to oscillatory load behavior.

17 Claims, 8 Drawing Sheets

PREVENTING OSCILLATORY LOAD BEHAVIOR IN A MULTI-NODE DISTRIBUTED SYSTEM

BACKGROUND

1. Field of the Invention

This disclosure generally relates to techniques for providing robust load balancing in a distributed system. More specifically, this disclosure relates to techniques for detecting and preventing oscillatory load behavior in a multi-node distributed system.

2. Related Art

The proliferation of the Internet and large data sets have made data centers and clusters of computers increasingly common. For instance, "server farms" typically combine large numbers of computers that are connected by high-speed networks to support services that exceed the capabilities of an individual computer. A designated "load manager" typically receives incoming service requests for the cluster, and then distributes the requests across individual nodes using techniques that strive to maximize the throughput of the cluster.

Unfortunately, efforts to evenly distribute requests across a cluster can often lead to oscillatory behavior. For instance, if one cluster node becomes overloaded, a load manager may move work from the overloaded node to another node. However, as a result, the original node may run out of work and become idle, while the target node in turn becomes overloaded by the additional transferred work. Hence, re-balancing attempts may result in nodes oscillating between idle and overloaded states, leading to inefficient operation and degraded performance. System administrators sometimes attempt to use heuristic techniques to reduce oscillation, but such heuristics often do not generalize well, and thus typically fail under changing operational conditions.

Hence, what is needed are techniques for distributing requests across a multi-node distributed system without the above-described problems of existing techniques.

SUMMARY

The disclosed embodiments provide a system that prevents oscillatory load behavior for a multi-node distributed system. During operation, the system uses a load-balancing policy to distribute requests to the nodes of the distributed system. The system determines operational characteristics for the nodes as they process a set of requests, and then uses these operational characteristics to compute machine queuing models that describe the machine state of each node. The system then uses this machine state for the nodes to determine whether the load-balancing policy and the distributed system are susceptible to oscillatory load behavior.

In some embodiments, the system uses the gathered machine queuing models and the specification for the load-balancing policy to fit a state-space model of the system, and then determines if the fitted state-space model is susceptible to oscillatory behavior.

In some embodiments, the system calculates a risk of oscillatory behavior based on the fitted state-space model and the current request workload. If the risk exceeds a specified threshold, the system adjusts the load-balancing policy to prevent oscillatory load behavior. For instance, in some embodiments the system may adjust tunable parameters for the load-balancing policy to prevent oscillatory load behavior. In alternative embodiments, the system may determine that adjusting tunable parameters is insufficient, and instead may change to a different load-balancing policy that reduces the risk of oscillatory load behavior.

In some embodiments, the system tracks the incoming request rate and the request service rate for each node. For instance, the system can use such tracked information to build a machine queuing model that describes the average request queue length and the average queue waiting time for a node.

In some embodiments, using a fitted state-space model and per-node machine queuing models facilitates dynamically detecting the risk for oscillatory behavior across application and system changes.

BRIEF DESCRIPTION OF THE FIGURES

The patent or application file contains at least one drawing executed in color. Copies of this patent or patent application publication with color drawing(s) will be provided by the Office upon request and payment of the necessary fee.

Table 1 illustrates a set of steady-state state transition equations for an exemplary node of a distributed system in accordance with an embodiment.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Oscillatory Behavior in Multi-Node Distributed Systems

Multi-node server farms typically combine large numbers of computers that are connected by high-speed networks to support services that exceed the capabilities of an individual computer. For instance, a multi-node distributed system can provide additional performance, scalability, and reliability for large-scale applications. Such distributed computing systems typically include a resource manager (or "load manager") that attempts to balance the amount of work that each node receives to maximize the performance of the system. For example, a load manager may monitor current resource utilization, provision for future resource usage, and make resource scheduling recommendations. Note that a cluster may support a large number of unique services that execute on hundreds of interconnected computing devices. Also note that each computing device (or node) in a cluster may also execute one or more services using a virtual machine (e.g., in a Java Virtual Machine™; Java Virtual Machine is a trademark of Oracle America, Inc.).

Efficiently utilizing the available distributed resources of a cluster can be challenging. One or more dedicated load managers typically receive a stream of requests on behalf of the distributed system, and then dispatch the requests to the nodes of the distributed system. Such requests may vary depending on the service and request type (e.g., "get data," "remove data," or "run a match query"). Furthermore, because the capabilities and utilization of the target node may also vary, the execution time for each request may vary widely as well. Load managers typically attempt to account for such variation by using static rules and/or a load-balancing policy that consider factors such as the current load, the type of deployment, and machine failures (and/or limitations) when dispatching requests to nodes. Note that load-balancing policies may range from basic techniques (e.g., simplistic round-robin or random request distribution) to sophisticated predictive scheduling techniques that employ artificial intelligence techniques.

Figure 1:
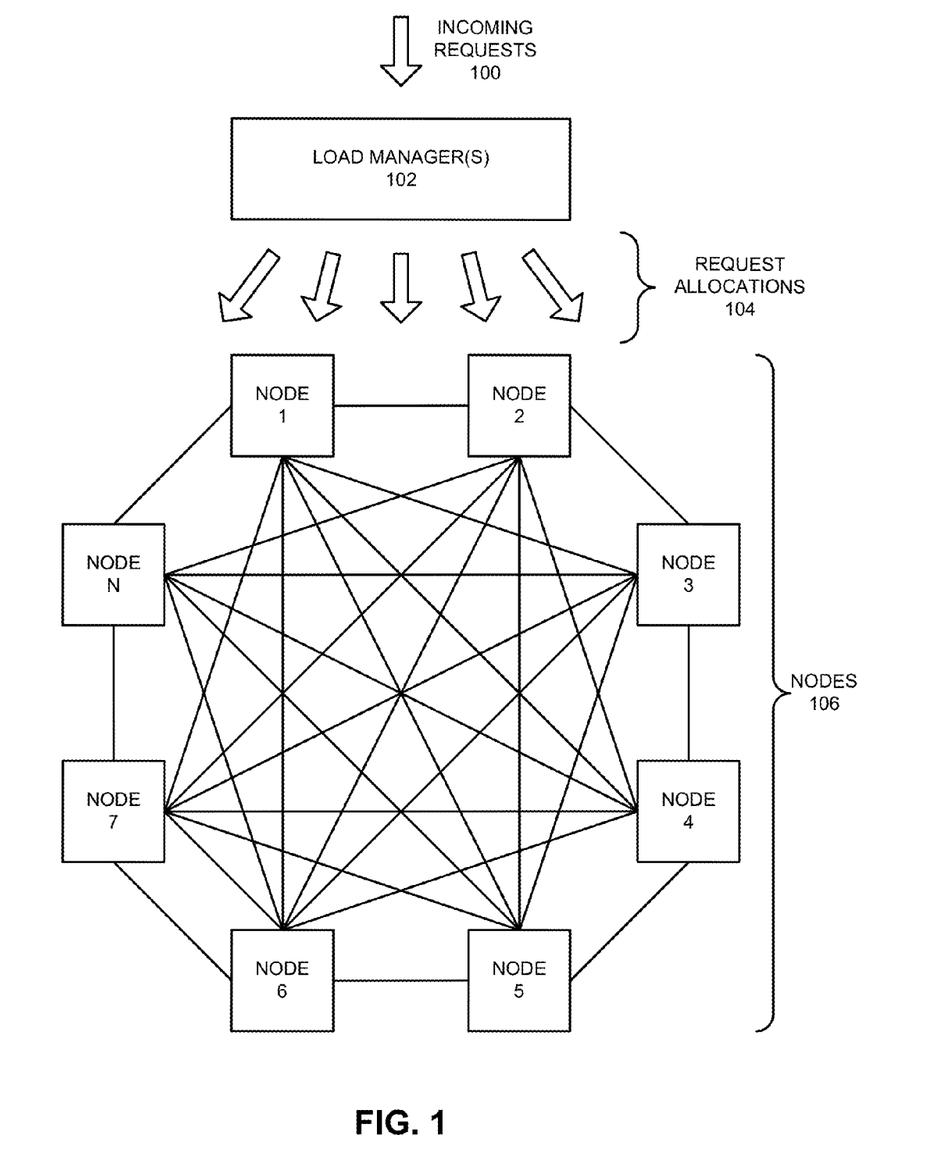
FIG. 1 illustrates an exemplary multi-node distributed system in accordance with an embodiment.

FIG. 1 illustrates an exemplary multi-node distributed system. Incoming requests 100 are received by one or more load managers 102, which then allocate requests 104 to N nodes 106 (e.g., computing devices). Each node may queue such requests until they can be processed and executed by worker threads (not shown).

Unfortunately, efforts to evenly distribute requests across a cluster can often lead to oscillatory behavior. The performance of overloaded components typically drops significantly, so as mentioned above, load managers are often configured to ensure that work is similarly distributed among nodes. For instance, upon detecting that one cluster node has become overloaded, a load manager may move work from the overloaded node to another node. However, as a result, the original node may run out of work and become idle, while the target node in turn becomes overloaded by the additional transferred requests. Hence, re-balancing attempts may result in nodes oscillating between idle and overloaded states, leading to inefficient operation and degraded performance.

Figure 2A:
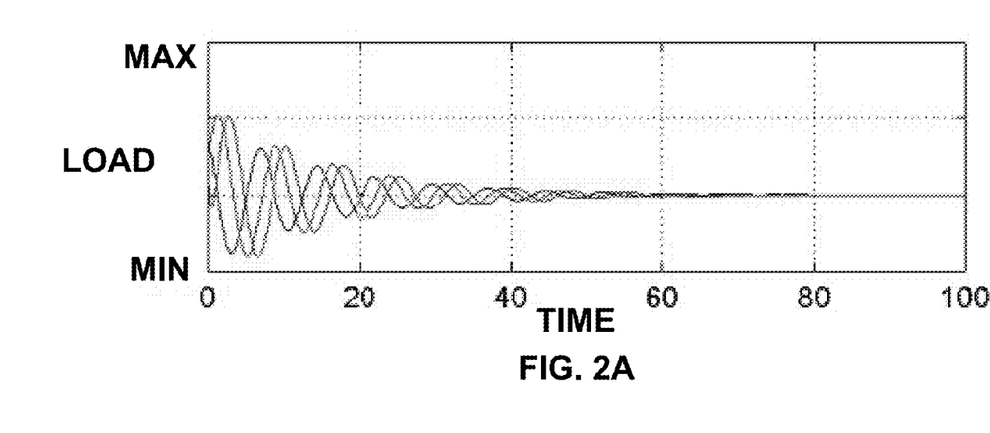
FIG. 2A illustrates oscillatory load behavior for a system with weak feedback via load-balancing coupling in accordance with an embodiment.
Figure 2B:
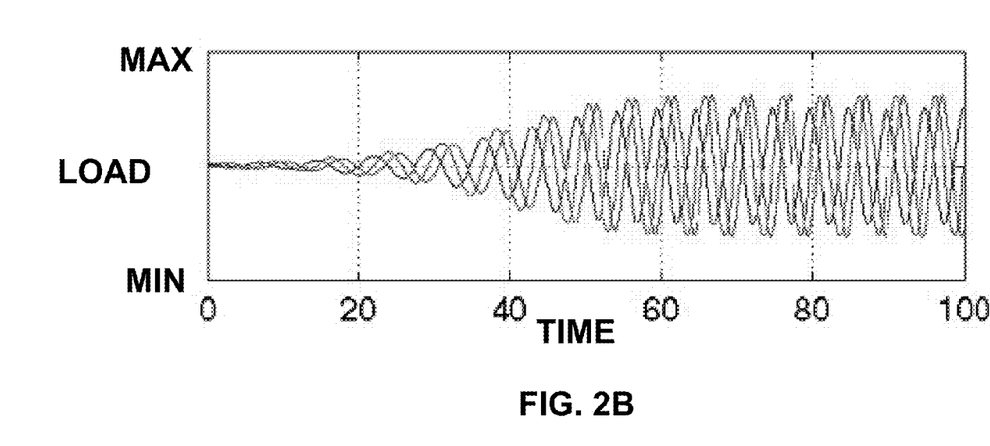
FIG. 2B illustrates oscillatory load behavior for a system with strong feedback via load-balancing coupling in accordance with an embodiment.

FIGS. 2A and 2B illustrate exemplary oscillatory load behavior in a cluster of three interconnected machines with weak and strong feedback (respectively) via load-balancing coupling. When the coupling introduced by load balancing and/or request distributors becomes sufficiently strong, node loads may begin to oscillate. The amount of load that needs to be shifted between nodes is typically proportional to the amount of coupling; a load mismatch between nodes in the presence of weak coupling may not require many requests to be shifted between nodes, and hence doesn't involve much disturbance to the distributed system. Conversely, strong coupling typically requires moving many requests between nodes, and hence often leads to load oscillation.

In FIG. 2B, the nodes of the system initially have equal loads, but start to oscillate due to high coupling strength. As a result, at any one time one of the three nodes has minimal (or no) load, leading to inefficient operation as nodes alternate between being over- and underloaded, and the average amount of work output for the system drops. Such situations can lead to energy waste and higher system provisioning costs.

In FIG. 2A, weaker load-balancing coupling leads to a more efficient outcome. While the three nodes start out oscillating, the weaker coupling allows the system to quickly settle down into an oscillation-free state where all three nodes operate more efficiently. Note that changing the strength of coupling may sometimes involve changing only a single load-balancing parameter.

Detecting and avoiding harmful load oscillation in multi-server distributed systems can substantially benefit system efficiency. Unfortunately, load oscillation is sometimes viewed subjectively, and is often difficult to manage. For instance, some experienced system administrators with insight into distributed system internals and operating characteristics may view one set of load behavior patterns as oscillatory and performance-degrading, while other system administrators may find such patterns to be normal and unalarming. Even when load oscillation is determined to be an issue, existing load-balancing efforts typically do not consider oscillation. Hence, efforts to curb oscillation often involve patching in heuristic techniques that attempt to avoid undesirable behavior indirectly based on a set of observed effects and characteristics. Such techniques usually do not generalize well, and thus typically fail under changing operational conditions. In the worst case, such heuristics may improperly treat normal dynamic behavior as oscillatory behavior, which can further degrade performance.

Some approaches that seek to reduce load-balancing-based oscillation are only applicable to weight-based load balancing environments (e.g., as disclosed in U.S. Pat. No.

7,890,624, issued 15 Feb. 2011), and limit the magnitude of weight change by heuristic metrics composed of various historic system parameters. Heuristic "oscillation" metrics that are based on the variability of weight changes over a certain historical window are rather subjective, and could lead to improperly treating normal dynamic behavior as being oscillatory. Other load-balancing techniques (e.g., as disclosed in (1) U.S. Pat. No. 6,128,642, issued 3 Oct. 2000, (2) U.S. Pat. No. 7,665,092, issued 16 Feb. 2010, and (3) U.S. Pat. No. 5,867,706, issued 2 Feb. 1999) do not analyze nor consider the possibility of load oscillation due to load-balancing rules, which typically severely limits their applicability in fielded applications and/or noticeably penalizes performance.

Embodiments of the present invention enable robust load balancing for multi-node distributed systems that avoids and/or prevents load oscillation. The disclosed techniques facilitate evaluating various load-balancing policies in the context of a multi-node distributed system, detecting conditions and/or properties that may lead to load oscillation, and then tuning load-balancing techniques to avoid oscillatory load behavior under current operating conditions.

Providing Robust Load Balancing that Prevents Oscillatory Behavior

Successfully preventing and correcting for oscillatory load behavior involves formally defining and detecting the onset of such behavior. Embodiments of the present invention employ formal mechanisms that represent a distributed system using a state-space approach and use a formal definition of oscillatory load behavior that considers both specific system properties and the feedback mechanisms introduced by load-balancing techniques.

In some embodiments, a load manager considers the full set of interconnected nodes of a distributed system as a single (complex) system. Individual nodes track their request arrival rates and the service times for a plurality of request types, and then compute both their average queue length and the average response time. A load manager collects such information for each node of the distributed system, and measures overall productivity by calculating how many requests are being served simultaneously. The load manager then evaluates the computed characteristics and available load-balancing policies using a system-level state-space representation that models load balancing as a feedback mechanism. The load manager can use these models to dynamically compare the performance of different load-balancing policies, and then chooses a robust load-balancing policy that reduces the risk of oscillatory load behavior, thus improving overall system performance. Such capabilities facilitate adapting load-balancing policies over time in response to request, load, application, and system changes, thereby ensuring that the distributed system is not adversely affected by load oscillation. Note that while the above description describes performing certain calculations and modeling in the nodes and/or load manager, such operations are by no means limited to the described components, and may be performed by a range of system entities.

Figure 3:
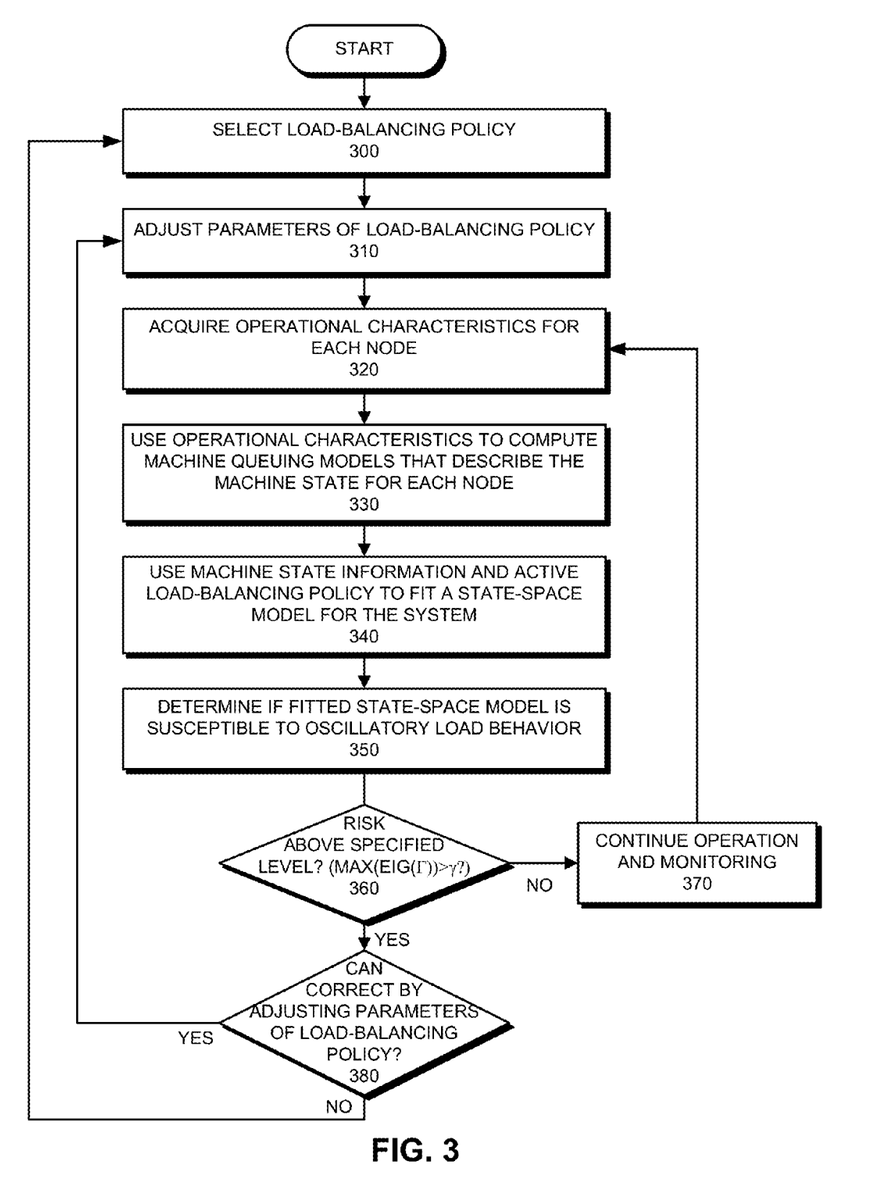
FIG. 3 presents a flow chart that illustrates the process of choosing a robust load-balancing policy that prevents oscillatory load behavior for a multi-node distributed system in accordance with an embodiment.

FIG. 3 presents a flow chart that illustrates the process of choosing a robust load-balancing policy that prevents oscillatory load behavior for a multi-node distributed system. During initialization, the system first selects an active load-balancing policy (operation 300) based on the characteristics of the distributed system (e.g., the deployment and capabilities of nodes) and expected operational factors (e.g., the set of supported applications, types of requests, etc.). If such information is not available, the system may use a default load-balancing policy. Next, the system adjusts the parameters of the selected load-balancing policy (operation 310) based on the available information. As before, if no information is available, the system may use a default set of load-balancing parameters.

After initializing the load-balancing policy, the system begins servicing requests. During operation, the system acquires (e.g., monitors and collects) operational characteristics for each node of the distributed system (operation 320). These characteristics can include, but are not limited to: (1) the arrival rates of various request types for each node; and (2) the request service rate for each request type for each node. The system uses this collected information to compute machine queuing models that describe the machine state of each node (operation 330) (e.g., in terms of average queue length and average waiting time in the queue). The system then uses these machine queuing models and the load-balancing policy to determine whether the load-balancing policy and the multi-node distributed system are susceptible to oscillatory load behavior (operations 340-350). More specifically, the system can feed the machine state information in the machine queuing models and the active load-balancing policy into a system identification module that fits a state-space model of the entire distributed system (operation 340). This state-space model describes the overall distributed system of interconnected nodes with high fidelity, and includes a feedback mechanism to represent load balancing (see the section on fitted state-space models below). The system can then analyze the fitted state-space model (including the active load-balancing policy) to determine whether the distributed system and active load-balancing policy are susceptible to oscillatory behavior (operation 350).

After analyzing the fitted state-space model, the system weighs the risk of oscillatory behavior (operation 360) (e.g., by comparing a set of conditions against a threshold). For instance, the fitted state-space model may indicate that the system is susceptible to oscillatory behavior, but the current request load may be so light that the actual risk is quite low. If this is the case, the system may continue to operate using the existing load-balancing policy, and perform ongoing monitoring (operation 370). If, however, the fitted state-space model indicates that the system is susceptible to oscillatory behavior, and the risk of such behavior is determined to be high, the system may determine whether adjusting the parameters of the load-balancing policy (e.g., to weaken the feedback) might sufficiently lower the risk of oscillatory load behavior (operation 380). If so, the system "tunes" the parameters of the active load-balancing policy (operation 310), and continues operation with the adjusted load-balancing policy. If adjusting these parameters is insufficient, the system selects a new load-balancing policy (operation 300). Note that situations may arise where all of the available load-balancing policies have a substantial risk of oscillatory load behavior; in this case, the system may choose the most robust of the available load-balancing policies and continue to monitor and adjust this policy based on changing operational conditions. In some embodiments, the system may also be configured to develop and evaluate new load-balancing policies if the set of existing load-balancing policies all suffer from substantial load oscillation.

Note that different load-balancing policies may have different behavior for different loads, and that typically no specific load-balancing policy can outperform all other load-balancing policies for all possible sets of loads. Hence, the ability to evaluate load-balancing policies during operation and switch to a load-balancing policy that meets specified performance objectives and does not cause load oscillations for the given load characteristics facilitates efficiently utilizing available hardware and software resources. In some embodiments, the load manager may be configured to weigh a set of trade-offs to achieve a plurality of goals while selecting a load-balancing policy. For instance, the load manager may be configured to consider a weighted sum of individual performance objectives or to optimize a secondary subset of goals after meeting a primary subset of goals.

The following sections describe aspects of determining machine queuing models and the overall state-space model in more detail.

Describing the Machine State of Nodes

As described above, the disclosed load-managing techniques build a fitted state-space model that describes the overall distributed system of interconnected nodes. Achieving an accurate overall system model depends on accurately modeling the characteristics of each individual node. In some embodiments, each node is modeled using a queuing theory model (also referred to as a QT model). For instance, the state of each node can be expressed in terms of an expected waiting time for queued requests, $W_q$, and an average number of service requests in the queue, $L_q$.

In some embodiments, each node receives k independent Poisson flows as inputs, where lambda ($\lambda$) indicates an average arrival rate. These k flows have parameters $\lambda_i$ (where i=1,2,3, ... , k), and the i-th flow consists of requests for a specific i-type of service. A node includes c service channels, each of which can serve any of the k flows. Requests are served in order of arrival, and requests that arrive when all channels are busy are queued to wait for an available channel. Request service times are exponentially distributed with the parameter $\mu_i^j$ (where i=1,2,3, ... , k; and j=1,2,3, ... , c), which depends on the types of requests and on how many channels are working simultaneously. Note that the service time does not depend on which channel executes a given request. The states of a node can be characterized by the probability of the number of requests of each type in the system (e.g., requests that are currently being executed or queued).

Figure 4:
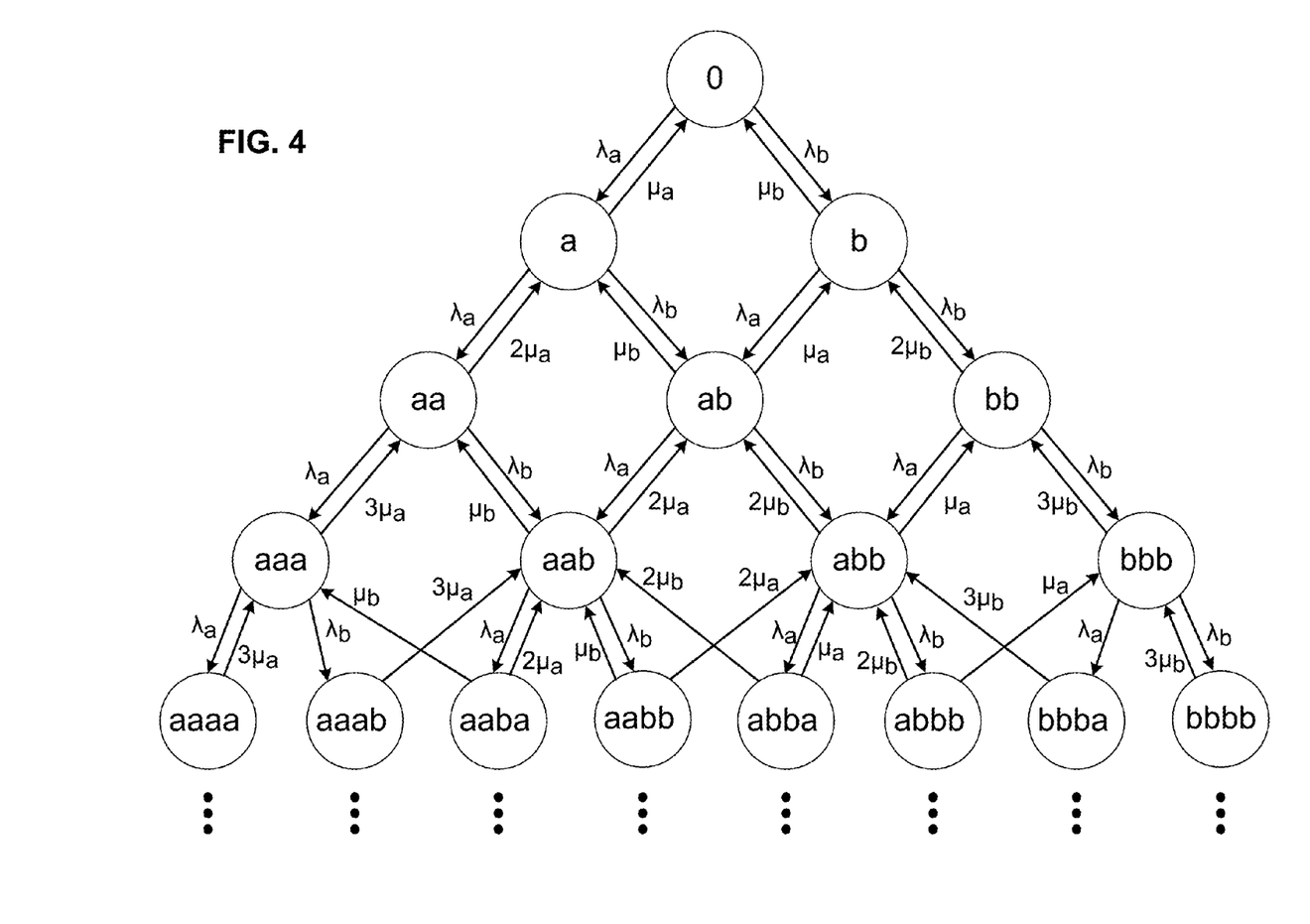
FIG. 4 illustrates a partial state graph for a node with three channels that can execute two types of requests in accordance with an embodiment.

FIG. 4 illustrates a partial state graph for a node with three channels that can execute two types of requests. In this graph, the set of states include:

State (0), where the system is free from requests for service;

States (a) and (b), where the system has one request, and this request is being serviced;

States (aa), (ab), and (bb), where the system has two requests, and these requests are being serviced;

States (aaa), (aab), (abb), and (bbb), where the system has three requests, and these requests are being serviced;

States (aaaa), (aaab), (aaba), (aabb), (abba), (abbb), (bbba), and (bbbb), where the system has four requests, three of which are being serviced, while one is queued;

States (aaaaa), (aaaab), . . . , (bbbba), and (bbbbb) (not shown in FIG. 4), where the system has five requests, three of which are being serviced, while two are queued;

etc.

FIG. 4 illustrates the state-to-state transitions for the illustrated states. Note that the graph in FIG. 4 only shows a queue length of two; the number of states grows exponentially with a positive growth factor equal to the number of request types.

Note that the transitions between states can be represented as a continuous stochastic Markov process and described using a set of Chapman-Kolmogorov equations. Table 1 shows a set of such equations for a steady-state of the exemplary node of FIG. 4, where $P_{aab}(t)$ is the probability of a state (aab) at time t. Numerically solving these equations gives the desired parameters for the node. Note that, as mentioned above, the number of states can become prohibitively large as the number of request types increases. The number of system states, given r types of requests, c channels, and a queue length L is given by the following expression:

$$\binom{r+c-1}{c} r^L = \frac{(r+c-1)!}{c!(r-1)!} r^L.$$

TABLE 1

Figure 5A:
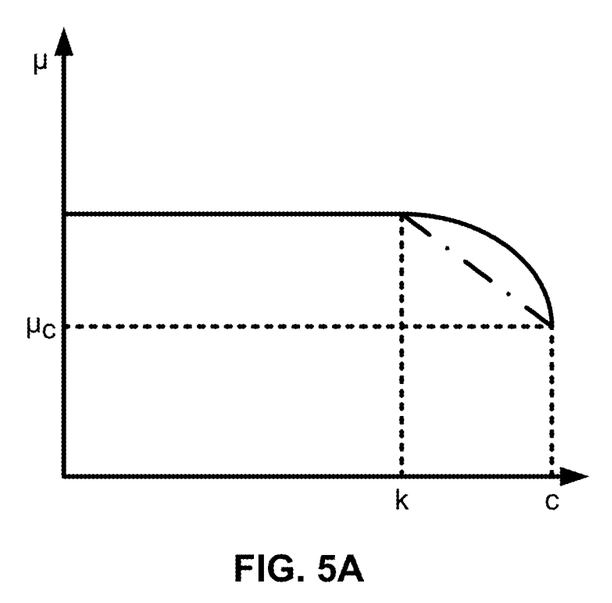
FIG. 5A illustrates a graph that shows how the number of simultaneously busy channels begins to affect the service rate at a value k in accordance with an embodiment.

$(\lambda_a + \lambda_b) * P_{\_\_} = \mu_a * P_a + \mu_b * P_b$
$(\mu_a + \lambda_a + \lambda_b) * P_a = \lambda_a * P_{\_\_} + 2 * \mu_a * P_{aa} + \mu_b * P_{ab}$
$(\mu_b + \lambda_a + \lambda_b) * P_b = \lambda_b * P_{\_\_} + \mu_a * P_{ab} + 2 * \mu_b * P_{bb}$
$(2 * \mu_a + \lambda_a + \lambda_b) * P_{aa} = \lambda_a * P_a + 3 * \mu_a * P_{aaa} + \mu_b * P_{aab}$
$(\mu_b + \mu_a + \lambda_a + \lambda_b) * P_{ab} = \lambda_b * P_a + \lambda_a * P_b + 2 * \mu_a * P_{aab} + 2 * \mu_b * P_{abb}$
$(2 * \mu_b + \lambda_a + \lambda_b) * P_{bb} = \lambda_b * P_b + \mu_a * P_{abb} + 3 * \mu_b * P_{bbb}$
$(3 * \mu_a + \lambda_a + \lambda_b) * P_{aaa} = \lambda_a * P_{aa} + 3 * \mu_a * P_{aaaa} + \mu_b * P_{aaba}$
$(\mu_b + 2 * \mu_a + \lambda_a + \lambda_b) * P_{aab} = \lambda_b * P_{aa} + \lambda_a * P_{ab} + 3 * \mu_a * P_{aaab} + 2 * \mu_b * P_{abba}$
$(2 * \mu_b + \mu_a + \lambda_a + \lambda_b) * P_{abb} = \lambda_b * P_{ab} + \lambda_a * P_{bb} + 2 * \mu_a * P_{aabb} + \mu_b * P_{abba} + 2 * \mu_b * P_{abbb} + 3 * \mu_b * P_{bbba}$
$(3 * \mu_b + \lambda_a + \lambda_b) * P_{bbb} = \lambda_b * P_{bb} + \mu_a * P_{abbb} + 3 * \mu_b * P_{bbbb}$
$(3 * \mu_a + \lambda_a + \lambda_b) * P_{aaaa} = \lambda_a * P_{aaa} + 3 * \mu_a * P_{aaaaa} + \mu_b * P_{aabaa}$
$(3 * \mu_a + \lambda_a + \lambda_b) * P_{aaab} = \lambda_b * P_{aaa} + 3 * \mu_a * P_{aaaab} + \mu_b * P_{aabab}$
$(\mu_b + 2 * \mu_a + \lambda_a + \lambda_b) * P_{aaba} = \lambda_a * P_{aab} + 3 * \mu_a * P_{aaaba} + 2 * \mu_a * P_{aabaa} + \mu_b * P_{aabba} + 2 * \mu_b * P_{abbaa}$
$(\mu_b + 2 * \mu_a + \lambda_a + \lambda_b) * P_{aabb} = \lambda_b * P_{aab} + 3 * \mu_a * P_{aaabb} + 2 * \mu_a * P_{aabab}$
$(2 * \mu_b + \mu_a + \lambda_a + \lambda_b) * P_{abba} = \lambda_a * P_{abb} + 2 * \mu_a * P_{aabba} + \mu_a * P_{abbaa} + 2 * \mu_b * P_{abbba} + 3 * \mu_b * P_{bbbaa}$
$(2 * \mu_b + \mu_a + \lambda_a + \lambda_b) * P_{abbb} = \lambda_b * P_{abb} + 2 * \mu_a * P_{aabbb} + \mu_a * P_{abbab} + 2 * \mu_b * P_{abbbb} + 3 * \mu_b * P_{bbbab}$
$(3 * \mu_b + \lambda_a + \lambda_b) * P_{bbba} = \lambda_a * P_{bbb} + \mu_a * P_{abbba} + 3 * \mu_b * P_{bbbba}$
$(3 * \mu_b + \lambda_a + \lambda_b) * P_{bbbb} = \lambda_b * P_{bbb} + \mu_a * P_{abbbb} + 3 * \mu_b * P_{bbbbb}$
$(3 * \mu_a) * P_{aaaaa} = \lambda_a * P_{aaaa}$
$(3 * \mu_a) * P_{aaaab} = \lambda_b * P_{aaaa}$
$(3 * \mu_a) * P_{aaaba} = \lambda_a * P_{aaab}$
$(3 * \mu_a) * P_{aaabb} = \lambda_b * P_{aaab}$
$(\mu_b + 2 * \mu_a) * P_{aabaa} = \lambda_a * P_{aaba}$
$(\mu_b + 2 * \mu_a) * P_{aabab} = \lambda_b * P_{aaba}$
$(\mu_b + 2 * \mu_a) * P_{aabba} = \lambda_a * P_{aabb}$
$(\mu_b + 2 * \mu_a) * P_{aabbb} = \lambda_b * P_{aabb}$
$(2 * \mu_b + \mu_a) * P_{abbaa} = \lambda_a * P_{abba}$
$(2 * \mu_b + \mu_a) * P_{abbab} = \lambda_b * P_{abba}$
$(2 * \mu_b + \mu_a) * P_{abbba} = \lambda_a * P_{abbb}$
$(2 * \mu_b + \mu_a) * P_{abbbb} = \lambda_b * P_{abbb}$
$(3 * \mu_b) * P_{bbbaa} = \lambda_a * P_{bbba}$
$(3 * \mu_b) * P_{bbbab} = \lambda_b * P_{bbba}$
$(3 * \mu_b) * P_{bbbba} = \lambda_a * P_{bbbb}$
$(3 * \mu_b) * P_{bbbbb} = \lambda_b * P_{bbbb}$ In some embodiments, the average queue length and average waiting time are computed for the case in which the productivity of service channels (e.g., the execution rate) depends on the number of simultaneously busy channels (i.e., parameter $\mu$ is a function of simultaneously busy channels). The number of simultaneously working channels starts to have an effect at the number k, where $1 \leq k \leq c$ (as illustrated in FIG. 5A). Starting at point k, the curve smoothly decreases and achieves its value $\mu_c$ at point c. From the requirement of smoothness at point k, it follows that the curve is concave. Hence, the curve lies above its chord, and so the chord can be used for the estimate of values of the curve. In this environment, the increment of decreasing is $\alpha = (\mu_0 - \mu_c)/(c-k)$, and $\mu_c = \mu_0 - (c-k)\alpha$. The steady-state equations for this case are:

$\lambda P_0 = \mu_0 P_1$ $(\lambda + i\mu_0)P_i = \lambda P_{i-1} + (i+1)\mu_0 P_{i+1}$, (where $1 \le i \le (k-1)$)

$(\lambda + (k+i)(\mu_0 - i\alpha))P_{k+i} = \lambda P_{k+i-1} + (k+1)(\mu_0 - (i+1)\alpha)P_{k+i+1}$, (where $0 \le i \le (c-k-1)$)

$(\lambda + c\mu_c)P_{c+i} = \lambda P_{c+i-1} + c\mu_c P_{c+i+1}$, $i \ge 1$

Solving these equations in terms of $P_0$, where $$\frac{\lambda}{\mu_0} = \rho_0 \text{ and } \frac{\lambda}{c\mu_c} = \rho_c,$$

one has:

$$P_i = \frac{\rho_0^i}{i!} P_0, \ 1 < i \le k$$

$$P_{(k+i)} = \frac{\rho_0^k \lambda^i}{(k+i)! \prod_{j=1}^{i}(\mu_0 - j\alpha)} P_0, \ 1 < i \le (c-k)$$

$$P_{(c+i)} = \frac{\rho_c^i \rho_0^k \lambda^{c-k}}{c! \prod_{j=1}^{c-k}(\mu_0 - j\alpha)} P_0, \ i > 0$$

Then, $$P_0^{-1} = \frac{\rho_0^k \lambda^{c-k}}{c!(1-\rho_c)\prod_{j=1}^{c-k}(\mu_0 - j\alpha)} + \rho_0^k \sum_{i=1}^{i=c-k-1} \frac{\lambda^i}{(k+i)! \prod_{j=1}^{i}(\mu_0 - j\alpha)} + \sum_{i=0}^{k} \frac{(\rho_0)^i}{i!}$$

and the average queue length is given by:

$$L_q = \frac{\lambda^{c-k} \rho_c \rho_0^k}{c!(1-\rho_c)^2 \prod_{j=1}^{(c-k)}(\mu_0 - j\alpha)} P_0.$$

Note that, in practice, having the precise arrival parameter values for each request type (as well as the execution time parameters for each request type) is unlikely. Hence, in some embodiments, the system computes analytical upper and lower bounds (e.g., pessimistic and optimistic estimates) for the key parameters (e.g., the average queue length and average waiting time) that will be used in the system-level state-space model. Note that a pessimistic estimate of such parameters may be more acceptable than estimates made on the basis of approximate data, since pessimistic calculations may be justified with great accuracy.

Figure 5B:
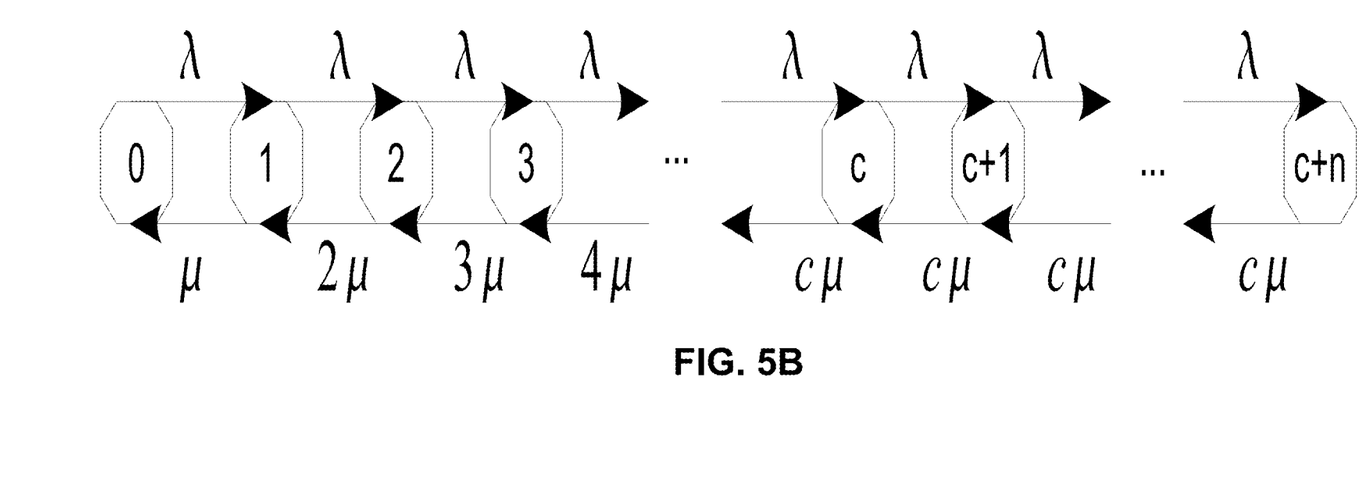
FIG. 5B illustrates the transition graph for a Poisson arrival flow in accordance with an embodiment.

When computing an upper bound, the average service time for each request type may be assumed to be the same, and equal to the average service time of the request requiring the maximum execution duration (i.e., $\mu_i^j = \mu = 1/T_{max(1,2,3,\ldots,k)}$). Obtaining the lower bound involves considering the execution time that corresponds to the request type with the smallest execution duration. This technique does not distinguish between different arrival flows, and follows the assumption that the system input is a Poisson flow with parameter $$\lambda = \sum_{i=1}^{k} \lambda_i$$

(where k is the number of different request types), which is illustrated by the transition graph in FIG. 5B. This graph is described by a set of linear different equations (with respect to t):

$$\frac{dP_0(t)}{dt} = -\lambda P_0(t) + \mu P_1(t)$$

$$\frac{dP_1(t)}{dt} = -(\lambda + \mu)P_1(t) + \lambda P_0(t) + 2\mu P_2(t)$$

$$\ldots$$

$$\frac{dP_{c+n}(t)}{dt} = -(\lambda + c\mu)P_{c+n}(t) + \lambda P_{c+n-1}(t) + c\mu P_{c+n+1}(t).$$

An equilibrium condition can be established for $\lambda/\mu < 1$. A time-independent steady-state equilibrium can be obtained by setting the derivatives with respect to time $t=0$ and solving the resulting steady-state equations:

$$\lambda P_0 = \mu P_1$$

$$(\lambda + \mu)P_1 = \lambda P_0 + 2\mu P_2$$

$$\ldots$$

$$(\lambda + (c+n)\mu)P_{c+n} = \lambda P_{c+n-1} + c\mu P_{c+n+1}.$$

Solving each equation regarding $P_0$ gives:

$$P_1 = \frac{\lambda}{\mu} P_0$$

$$\ldots$$

$$P_{c+n} = \frac{1}{c^n c!}\left(\frac{\lambda}{\mu}\right)^{c+n} P_0.$$

The probability $P_0$ is found from the condition $$\sum_{i=0}^{\infty} P_i = 1,$$

as $$P_0 = \left(\sum_{i=0}^{c-1} \frac{(c\rho)^i}{i!} + \frac{(c\rho)^c}{c!(1-\rho)}\right)^{-1},$$

where $\rho = \frac{\lambda}{c\mu}$.

Hence, the average number of queued requests is $$L_q = \frac{\rho(c\rho)^c}{c!(1-\rho)^2} P_0$$

and the average waiting time in the queue is $$W_q = \frac{L_q}{\lambda} = \frac{\rho(c\rho)^c}{\lambda c!(1-\rho)^2} P_0.$$

Note that the above techniques accurately model the number of independent processing capabilities (e.g., active channels) available in a given node. The request processing rate (μ) for a given node will be higher for nodes that include several processors or multi-core processors that can execute multiple requests in parallel (in comparison with a multi-threaded processor, which may use the thread abstraction to use local resources more efficiently, but can only actively execute one request at a given time). Hence, the machine queuing model for a given node can accurately model and convey such different characteristics using the above-described values and techniques.

Using Fitted State-Space Models to Determine Risk of Oscillatory Behavior

As described above, a fitted state-space model provides a general overall model for a dynamic distributed system that consists of interconnected elements with feedback. Data is collected from individual nodes of the distributed system to calculate the specific state variables for each node (e.g., the average queue lengths and average execution times for each node), and these variables are then input into the state-space model. Load-balancing policies can introduce weak or strong feedback into this system, and both load-balancing policies and the properties of individual systems can trigger conditions that lead to oscillatory phenomena in the distributed system.

Note that fitted state-space models can only approximate real systems to a certain degree; building a model that exactly describes a distributed system is typically infeasible. For instance, the machine queuing model used to describe the states of each node may not always be easy to solve and/or the number of states may become prohibitively large, in which case numerical methods (and/or different modeling formulas) may be needed to approximate the needed values. Such models may also be inaccurate for other reasons (e.g., there may be unexpected correlations in input traffic). However, modeling efforts that include approximations and potential errors can still often provide insights that can significantly improve performance.

In some embodiments, the distributed system is modeled using a state-space model of a load-balanced group of dynamic systems:

$$\dot{x} = f(x,u)$$

$$y = g(x)$$

$$u = h(y)$$

where x denotes a state vector of a system of n machines, y denotes output, and u denotes the feedback mechanism. A linear state-space model for this distributed system can be expressed as:

$$\dot{x} = Ax + Bu$$

$$y = Cx$$

$$u_i = -\Sigma \gamma_{ij}(y_i - y_j)$$

In this representation, the cluster of interconnected systems becomes oscillatory when the individual systems possess stable non-minimum phase-transfer functions (e.g., poles<1, zeros>=1) and the maximum Eigen value of the feedback topology matrix $$\Gamma = \begin{pmatrix} \sum_{i=1}^{k} \gamma_{1i} & -\gamma_{12} & \cdots & -\gamma_{1k} \\ -\gamma_{21} & \sum_{i=1}^{k} \gamma_{2i} & \cdots & -\gamma_{2k} \\ \cdots & & & \\ -\gamma_{k1} & -\gamma_{k2} & \cdots & \sum_{i=1}^{k} \gamma_{ki} \end{pmatrix}$$

exceeds a certain threshold $$\max(eig(\Gamma)) > \bar{\gamma}.$$

Note that this threshold corresponds to the threshold that can be used to weigh the risk of oscillatory behavior in FIG. 3.

The model parameter matrices A, B, and C can be constructed by observing the distributed system's operation and by fitting the model into the accumulated data with either no load-balancing policy or a specific load-balancing policy activated. Estimated system parameters can be compared against conditions for emergence of oscillatory behavior to determine the most robust load-balancing policy for a set of operating conditions.

In some embodiments, the model parameters are determined by running simulations with values of x and y that have been generated using a detailed model of node that processes requests with specified arrival process characteristics. Various load-balancing policies can be activated for these values to determine appropriate parameters.

In some embodiments, the state-space model is used to evaluate the characteristics of the distributed system and the active load-balancing policy in an attempt to match a set of conditions that indicate whether the system has acceptable load oscillation. The state-space model specifies those conditions explicitly; the two conditions that can lead to oscillatory behavior are: (1) the presence of a specific feedback mechanism; and (2) the parameters of the distributed system itself. Once the distributed system has been fitted to a state-space model, these two conditions can be checked against the threshold to determine if the system is susceptible to oscillatory behavior. In some embodiments, using a state-space model provides conditions leading to oscillatory load behavior when each machine is globally stable but locally unstable (e.g., the system is stable for certain conditions, but the inverse may become unstable) and the feedback is sufficiently strong.

In some embodiments, the above-described techniques can be used to provide a barrier for malicious attacks that exploit load-balancing mechanisms. For instance, the system may detect such an attack based on the request load's impact on the state-space model, and in response switch (or recommend switching) to a more robust load-balancing policy that is not susceptible to the specific exploits.

In summary, embodiments of the present invention facilitate detecting and preventing oscillatory load behavior in a multi-node distributed system. The described embodiments enable load managers to detect unfavorable combinations of load-balancing settings, system properties, and natural load perturbations, and react appropriately. Unlike heuristics, fitted node- and system-level models provide a general solution that can accurately detect susceptibility to oscillatory behavior across system and load changes. Load oscillation is a significant contributor to performance degradation in distributed systems, and hence such techniques can substantially improve system performance.

Computing Environment

Figure 6:
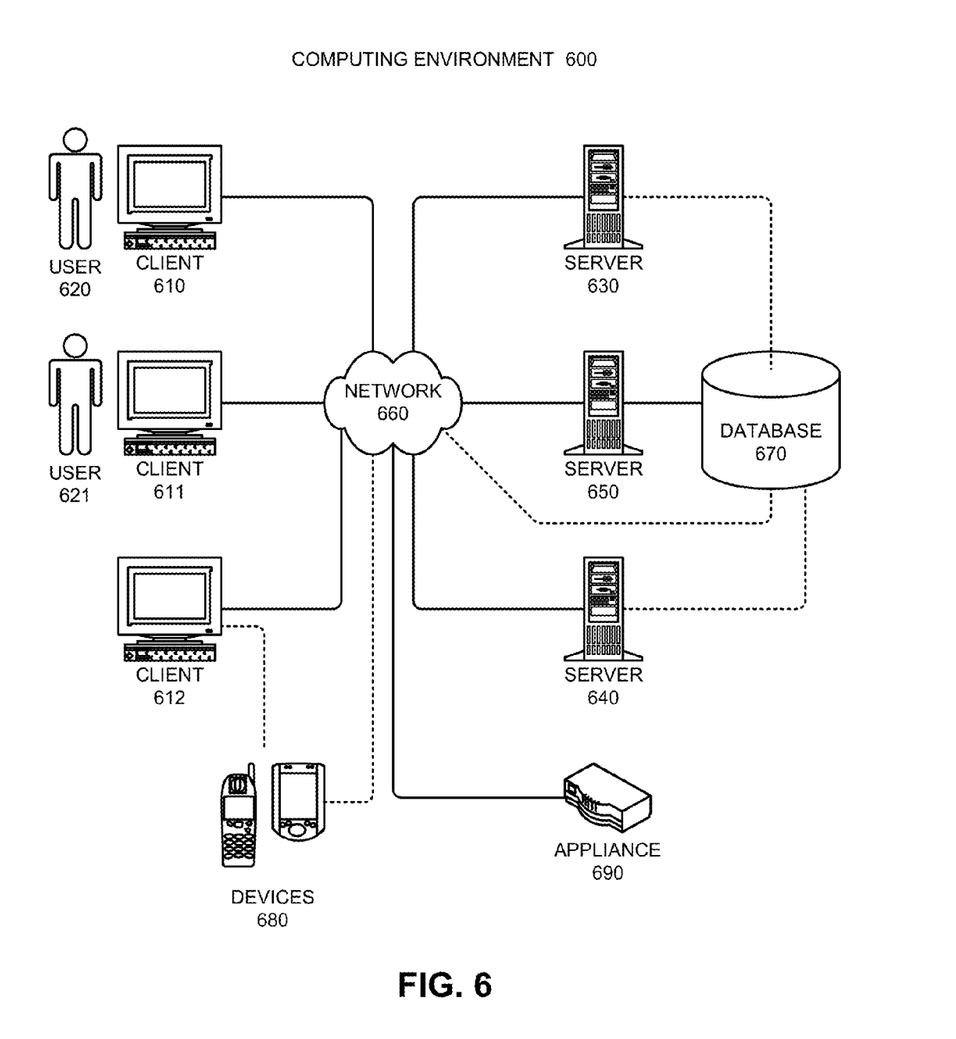
FIG. 6 illustrates a computing environment in accordance with an embodiment.

In some embodiments of the present invention, techniques for detecting and preventing oscillatory load behavior can be incorporated into a wide range of computing devices in a computing environment. For example, FIG. 6 illustrates a computing environment 600 in accordance with an embodiment of the present invention. Computing environment 600 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 6, computing environment 600 includes clients 610-612, users 620 and 621, servers 630-650, network 660, database 670, devices 680, and appliance 690.

Clients 610-612 can include any node on a network that includes computational capability and includes a mechanism for communicating across the network. Additionally, clients 610-612 may comprise a tier in an n-tier application architecture, wherein clients 610-612 perform as servers (servicing requests from lower tiers or users), and wherein clients 610-612 perform as clients (forwarding the requests to a higher tier).

Similarly, servers 630-650 can generally include any node on a network including a mechanism for servicing requests from a client for computational and/or data storage resources. Servers 630-650 can participate in an advanced computing cluster, or can act as stand-alone servers. For instance, computing environment 600 can include a large number of compute nodes that are organized into a computing cluster and/or server farm. In one embodiment of the present invention, server 640 is an online "hot spare" of server 650.

Users 620 and 621 can include: an individual; a group of individuals; an organization; a group of organizations; a computing system; a group of computing systems; or any other entity that can interact with computing environment 600.

Network 660 can include any type of wired or wireless communication channel capable of coupling together computing nodes. This includes, but is not limited to, a local area network, a wide area network, or a combination of networks. In one embodiment of the present invention, network 660 includes the Internet. In some embodiments of the present invention, network 660 includes phone and cellular phone networks.

Database 670 can include any type of system for storing data in non-volatile storage. This includes, but is not limited to, systems based upon magnetic, optical, or magneto-optical storage devices, as well as storage devices based on flash memory and/or battery-backed up memory. Note that database 670 can be coupled: to a server (such as server 650), to a client, or directly to a network. In some embodiments of the present invention, database 670 is used to store information that may later be stored in unused bits of a memory pointer. Alternatively, other entities in computing environment 600 may also store such data (e.g., servers 630-650).

Devices 680 can include any type of electronic device that can be coupled to a client, such as client 612. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 680 can be coupled directly to network 660 and can function in the same manner as clients 610-612.

Appliance 690 can include any type of appliance that can be coupled to network 660. This includes, but is not limited to, routers, switches, load balancers, network accelerators, and specialty processors. Appliance 690 may act as a gateway, a proxy, or a translator between server 640 and network 660.

Note that different embodiments of the present invention may use different system configurations, and are not limited to the system configuration illustrated in computing environment 600. In general, any device that includes memory and I/O pathways may incorporate elements of the present invention.

Figure 7:
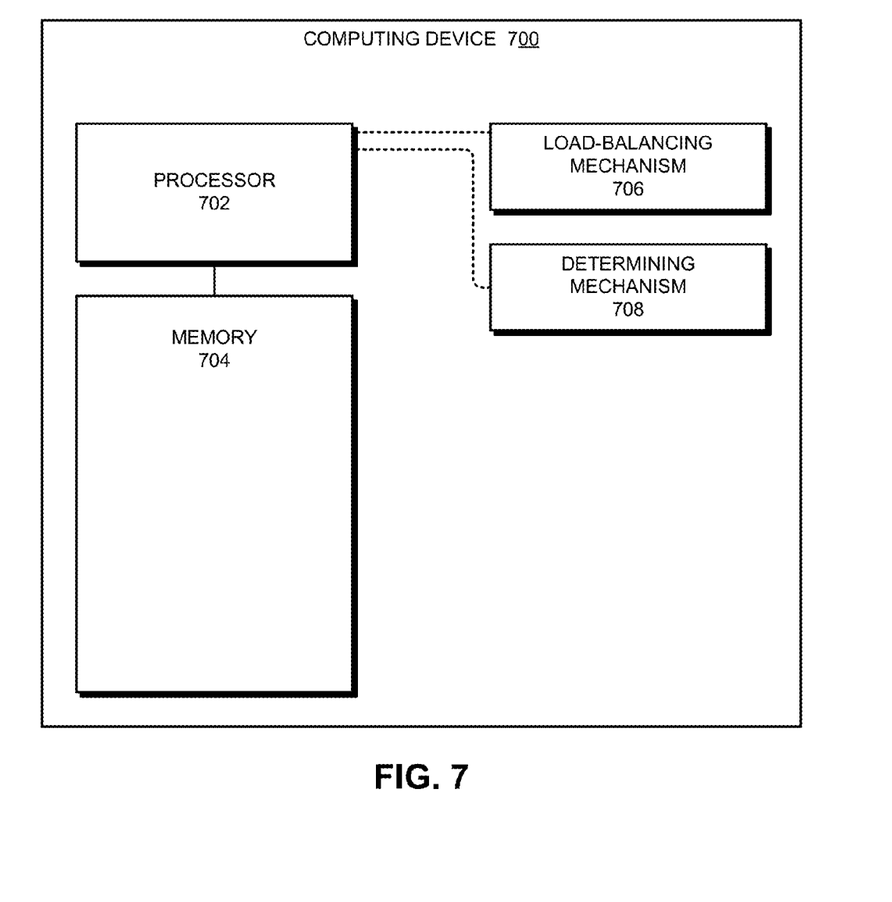
FIG. 7 illustrates a computing device in accordance with an embodiment.

FIG. 7 illustrates a computing device 700 that includes a processor 702 and a memory 704. Computing device 700 also includes a load-balancing mechanism 706 and a determining mechanism 708. Computing device 700 uses load-balancing mechanism 706 and determining mechanism 708 to prevent oscillatory load behavior in a multi-node distributed system.

During operation, computing device 700 uses load-balancing mechanism 706 to distribute requests to the nodes of the distributed system. Computing device 700 uses processor 702 and determining mechanism 708 to determine operational characteristics for the nodes as they process a set of requests, and determining mechanism 708 uses these operational characteristics to compute machine queuing models that describe the machine state of each node. Determining mechanism 708 then uses this machine state for the nodes to determine whether the load-balancing policy and the distributed system are susceptible to oscillatory load behavior.

In some embodiments of the present invention, some or all aspects of load-balancing mechanism 706 and/or determining mechanism 708 can be implemented as dedicated hardware modules in computing device 700. These hardware modules can include, but are not limited to, processor chips, application-specific integrated circuit (ASIC) chips, field-programmable gate arrays (FPGAs), memory chips, and other programmable-logic devices now known or later developed.

Processor 702 can include one or more specialized circuits for performing the operations of the mechanisms. Alternatively, some or all of the operations of load-balancing mechanism 706 and/or determining mechanism 708 may be performed using general-purpose circuits in processor 702 that are configured using processor instructions. Thus, while FIG. 7 illustrates load-balancing mechanism 706 and/or determining mechanism 708 as being external to processor 702, in alternative embodiments some or all of these mechanisms can be internal to processor 702.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
   using a load-balancing policy to distribute requests to nodes of a multi-node distributed system;
   determining operational characteristics for two or more nodes of the multi-node distributed system as the two or more nodes process a set of requests, wherein determining operational characteristics for a node comprises tracking an incoming request rate and a request service rate for the node;
   using the operational characteristics to compute machine queuing models that describe a machine state of the two or more nodes; and
   determining, by computer, from the machine state for the nodes whether the load-balancing policy and the multi-node distributed system are susceptible to oscillatory load behavior.

2. The method of claim 1, wherein determining whether the load-balancing policy and the multi-node distributed system are susceptible to oscillatory load behavior further comprises:
   using the machine queuing models and the load-balancing policy to fit a state-space model of the system; and
   determining if the fitted state-space model is susceptible to oscillatory behavior.

3. The method of claim 2, wherein determining if the fitted state-space model is susceptible to oscillatory behavior further comprises:
   calculating a risk of oscillatory behavior based on the fitted state-space model and the current request workload; and
   if the risk exceeds a specified threshold, adjusting the load-balancing policy to reduce the risk of oscillatory load behavior for the multi-node distributed system.

4. The method of claim 3, wherein adjusting the load-balancing policy comprises adjusting tunable parameters for the load-balancing policy.

5. The method of claim 3, wherein adjusting the load-balancing technique comprises:
   determining that adjusting tunable parameters for the load-balancing policy is insufficient to prevent oscillatory load behavior for the multi-node distributed system; and
   changing to a different load-balancing policy that prevents oscillatory load behavior for the multi-node distributed system.

6. The method of claim 1, wherein computing the machine queuing model for the node further involves using the incoming request rate and the request service rate for the node to calculate an average request queue length and an average queue waiting time for the node.

7. The method of claim 6, wherein using the fitted state-space model and per-node machine queuing models facilitates dynamically detecting the risk for oscillatory behavior in the multi-node distributed system across application and system changes.

8. A non-transitory computer-readable storage medium storing instructions that when executed by a computer cause the computer to perform a method, the method comprising:
   using a load-balancing policy to distribute requests to nodes of a multi-node distributed system;
   determining operational characteristics for two or more nodes of the multi-node distributed system as the two or more nodes process a set of requests, wherein determining operational characteristics for a node comprises tracking an incoming request rate and a request service rate for the node;
   using the operational characteristics to compute machine queuing models that describe a machine state of the two or more nodes; and
   determining from the machine state whether the load-balancing policy and the multi-node distributed system are susceptible to oscillatory load behavior.

9. The non-transitory computer-readable storage medium of claim 8, wherein determining whether the load-balancing policy and the multi-node distributed system are susceptible to oscillatory load behavior further comprises:
   using the machine queuing models and the load-balancing policy to fit a state-space model of the system; and
   determining if the fitted state-space model is susceptible to oscillatory behavior.

10. The non-transitory computer-readable storage medium of claim 9, wherein determining if the fitted state-space model is susceptible to oscillatory behavior further comprises:
    calculating a risk of oscillatory behavior based on the fitted state-space model and the current request workload; and
    if the risk exceeds a specified threshold, adjusting the load-balancing policy to reduce the risk of oscillatory load behavior for the multi-node distributed system.

11. The non-transitory computer-readable storage medium of claim 10, wherein adjusting the load-balancing policy comprises adjusting tunable parameters for the load-balancing policy.

12. The non-transitory computer-readable storage medium of claim 10, wherein adjusting the load-balancing technique comprises:
    determining that adjusting tunable parameters for the load-balancing policy is insufficient to prevent oscillatory load behavior for the multi-node distributed system; and
    changing to a different load-balancing policy that prevents oscillatory load behavior for the multi-node distributed system.

13. The non-transitory computer-readable storage medium of claim 8, wherein computing the machine queuing model for the node further involves using the incoming request rate and the request service rate for the node to calculate an average request queue length and an average queue waiting time for the node.

14. The computer-implemented method of claim 13, wherein using the fitted state-space model and per-node machine queuing models facilitates dynamically detecting the risk for oscillatory behavior in the multi-node distributed system across application and system changes.

15. A computing device, comprising:
    a processor;
    a load-balancing mechanism configured to use a load-balancing policy to distribute requests to nodes of a multi-node distributed system; and
    a determining mechanism configured to use operational characteristics to compute machine queuing models that describe a machine state for two or more nodes of the multi-node distributed system;

wherein the machine state information is computed based on operational characteristics gathered for the two or more nodes as the two or more nodes process a set of requests, wherein gathering operational characteristics for a node comprises tracking an incoming request rate and a request service rate for the node; and wherein the determining mechanism is further configured to determine from the machine state for the two or more nodes whether the load-balancing policy and the multi-node distributed system are susceptible to oscillatory load behavior.

16. The computing device of claim 15, wherein the determining mechanism is further configured to determine if the multi-node distributed system is susceptible to oscillatory load behavior by:

using the machine state information and the load-balancing policy to fit a state-space model of the system; and determining if the fitted state-space model is susceptible to oscillatory behavior.

17. The computing device of claim 16, wherein the determining mechanism is further configured to:

calculate a risk of oscillatory behavior based on the fitted state-space model and the current request workload; and if the risk exceeds a specified level, adjust the load-balancing policy to reduce the risk of oscillatory load behavior for the multi-node distributed system.

* * * * *